United States Patent
Berretta

(10) Patent No.: US 9,569,409 B2
(45) Date of Patent: Feb. 14, 2017

(54) DOCUMENT ATTRIBUTE-BASED CITATION SYSTEM

(71) Applicant: Frederick Berretta, San Diego, CA (US)

(72) Inventor: Frederick Berretta, San Diego, CA (US)

( * ) Notice: Subject to any disclaimer, the term of this patent is extended or adjusted under 35 U.S.C. 154(b) by 251 days.

(21) Appl. No.: 13/909,908

(22) Filed: Jun. 4, 2013

(65) Prior Publication Data

US 2014/0245136 A1 Aug. 28, 2014

Related U.S. Application Data

(60) Provisional application No. 61/768,263, filed on Feb. 22, 2013.

(51) Int. Cl.
*G06F 17/00* (2006.01)
*G06F 17/21* (2006.01)

(52) U.S. Cl.
CPC .......... *G06F 17/218* (2013.01); *G06F 17/211* (2013.01)

(58) Field of Classification Search
CPC ............................ G06F 17/211; G06F 17/212
USPC ....................................................... 715/249
See application file for complete search history.

(56) References Cited

U.S. PATENT DOCUMENTS

| | | | | |
|---|---|---|---|---|
| 4,773,009 A | | 9/1988 | Kucera et al. | |
| 5,293,314 A | | 3/1994 | Saki | |
| 5,392,428 A | * | 2/1995 | Robins | G06F 17/30722 |
| 5,608,625 A | * | 3/1997 | Bailey | G06F 17/211 |
| | | | | 715/229 |
| 5,808,615 A | * | 9/1998 | Hill | G06F 17/30675 |
| | | | | 345/440 |
| 5,855,015 A | * | 12/1998 | Shoham | G06F 17/30648 |
| | | | | 707/694 |
| 6,216,123 B1 | * | 4/2001 | Robertson | G06F 17/30622 |
| 6,704,698 B1 | | 3/2004 | Paulsen et al. | |
| 6,856,988 B1 | * | 2/2005 | Humphrey | G06F 17/27 |
| | | | | 704/1 |
| 7,028,259 B1 | * | 4/2006 | Jacobson | G06F 17/278 |
| | | | | 715/236 |
| 7,246,310 B1 | * | 7/2007 | Wolfe | G06F 17/30716 |
| | | | | 358/1.15 |
| 7,529,756 B1 | * | 5/2009 | Haschart | G06F 17/30728 |
| 7,716,226 B2 | * | 5/2010 | Barney | G06F 17/30675 |
| | | | | 707/748 |

(Continued)

OTHER PUBLICATIONS

Missen, Malik Muhammad Saad, et al, "Comparing Semantic Associations in Sentences and Paragraphs for Opinion Detection in Blogs," Oct. 2009, MEDES '09: Proceedings of the International Conference on Management of Emergent Digital EcoSystems, pp. 483-488.*

(Continued)

*Primary Examiner* — Laurie Ries
(74) *Attorney, Agent, or Firm* — Gazdzinski & Associates, PC

(57) ABSTRACT

Document citation apparatus and methods. In one embodiment, a citation system and methods of citation based on the non-arbitrary and/or constant attributes of a document (e.g., article or legal decision) itself are utilized. Such an improved citation system eliminates the problem of having to rely upon a temporary citation system until the volume and page numbers of the reporter are determined.

10 Claims, 3 Drawing Sheets

(56) References Cited

U.S. PATENT DOCUMENTS

| | | | | |
|---|---|---|---|---|
| 7,844,899 B2* | 11/2010 | Boucher | ............ | G06F 17/30728 715/230 |
| 8,019,769 B2* | 9/2011 | Rolle | .................. | G06F 17/2775 707/755 |
| 8,332,384 B2* | 12/2012 | Kemp | ............... | G06F 17/30728 707/708 |
| 8,396,882 B2* | 3/2013 | Zhang | ............... | G06F 17/30539 707/758 |
| 2005/0097179 A1* | 5/2005 | Orme | .................... | H04L 12/585 709/207 |
| 2006/0236234 A1* | 10/2006 | Michelstein | ........ | G06F 17/2247 715/210 |
| 2006/0248440 A1* | 11/2006 | Rhoads | ............. | G06F 17/30728 715/236 |
| 2008/0120129 A1* | 5/2008 | Seubert | .................. | G06Q 10/06 705/35 |
| 2009/0119255 A1* | 5/2009 | Frank et al. | ....................... | 707/3 |
| 2009/0254572 A1* | 10/2009 | Redlich | .................. | G06Q 10/06 |
| 2012/0066201 A1* | 3/2012 | Suman | .............. | G06F 17/30023 707/710 |
| 2012/0117120 A1* | 5/2012 | Jacobson et al. | ............. | 707/793 |

OTHER PUBLICATIONS

Mandreoli, Federica, et al, "A Syntactic Approach for Searching Similarities Within Sentences," Nov. 2002, CIKM '02: Proceedings of the Eleventh International Conference on Information and Knowledge Management, pp. 635-637.*

* cited by examiner

DOCUMENT ATTRIBUTE-BASED CITATION SYSTEM

PRIORITY

This application claims priority to U.S. Provisional Patent Application Ser. No. 61/768,263 filed Feb. 22, 2013 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

This disclosure relates generally to systems and methods of citation, and in one exemplary aspect to citation for documents such as legal decisions and other types of written materials, whether in hardcopy or electronic (e.g., electronically-captured) format.

2. Description of Related Technology

Generally, document citation systems include information to identify the document, such as case name, title, court, author, date, publication in which the document is published, and combinations of these. As used herein, the term "document" refers without limitation to hardcopy (e.g., paper) documents, electronic documents such as pdf formatted documents, HTML or XML renderings, images, virtual or on-line documents, and other human-perceivable renderings. These document citation systems also generally include information to locate specific text within the document, such as a page number. For example, a commonly used citation system for legal decisions from the state and federal courts of the United States utilizes a reporter-based system in which the legal decisions issued by the various courts are gathered and published in various reporters, such as Westlaw™ or BNA™ reporters.

The citation for legal decisions generally includes the case name, the name of the court issuing the decision, a date or year of the decision, the volume number for the reporter, the page number in the reporter where the decision starts, and to locate specific text within the decision a second page number often referred to as a "pinpoint" cite. For example, the decisions of the federal appellate courts of the United States, including the Court of Appeals for the Federal Circuit located in Washington, D.C., are gathered in a Westlaw reporter known as the "federal" reporter. Currently this reporter is in its third series, and is indicated by the symbol "F.3d." For example, the case citation to the Federal Circuit's landmark 1995 decision on claim construction is commonly written as *Markman v. Westview Instruments, Inc.*, 52 F.3d 967 (Fed. Cir. 1995). The number preceding the "F.3d" is the volume number of the reporter in which the case is published, and the number following the "F.3d" is the page number where the decision starts within the volume of the reporter. In order to cite to specific text using a pinpoint cite, a third page number is typically added. For example, if one wanted to cite to the specific location in the decision at which the Federal Circuit held that the interpretation and construction of patent claims "is a matter of law," that appears on page 970 in the reporter and the citation would commonly be written as *Markman v. Westview Instruments, Inc.*, 52 F.3d 967, 970 (Fed. Cir. 1995). Other reporter systems use similar citation systems.

The problem with these prior art citation systems is that they depend upon the placement of the article or legal decision in a particular volume of a reporter, and starting at a particular page number within the particular volume of the reporter, both of which are somewhat arbitrary. Moreover, depending upon the formatting, line spacing, and font size used in the reporter, the article or legal decision could occupy different numbers of pages. Thus, the location of a pinpoint cite within the article or legal decision using these prior art citation systems is also somewhat arbitrary depending upon how many pages the article or legal decision occupies within the reporter. Because of these problems, it is not possible to use these prior art reporter systems to cite an article or legal decision until the publisher determines which volume of the reporter will contain the article or legal decision, and the page numbers within the particular chosen volume at which the article or legal decision will be located. This process of locating the article or decision within a reporter by the publisher can often take weeks or months after the date the article or legal decision is completed and made public, thus requiring the use of an alternate or temporary citation system if one wishes to cite to a recently issued article or legal decision.

Moreover, in order to use these prior art citation systems, one must first determine the correct volume and page numbers for the particular reporter in which the article or decision appears (or the temporary arbitrary decision number assigned to the newly-issued decision). This process consumes additional time and generally requires access to proprietary search databases maintained by the publishers of the reporters, who charge relatively high fees for such access. Many users of these legal citation systems are troubled by the fact that they must pay private enterprises for access to the proprietary search databases of legal decisions merely to obtain the arbitrary volume and page numbers of the reporter (or the arbitrary temporary decision number) needed to cite to the legal decision, when the legal decisions themselves are publicly available documents generated by the various taxpayer-supported state and federal courts of the United States. For example, the legal decisions of the Court of Appeals for the Federal Circuit are generally available on that court's public website the day they are issued. However, in order to use these prior art citation systems, one must access a proprietary database in order to determine the volume and page numbers of the federal reporter in which the decision appears, which often are not available until weeks after the decision is issued. In such instances, as discussed above, a temporary and also arbitrary alternate citation number is the only one available. Thus, the user must often repeat the search process at a later date, often paying additional fees, in order to obtain the permanent citation information for the same legal decision.

SUMMARY

The present disclosure satisfies the foregoing needs by providing, inter alia, improved method and apparatus for document citation.

In one aspect, a method of utilizing citations within a document is disclosed. In one embodiment, the method includes: providing an electronic rendering of the document accessible via an internetwork; identifying at least one non-changing attribute or feature of the document within the electronic rendering; and searching for the document via the internetwork based at least in part on the at least one attribute or feature.

In another aspect, a method of citation of a document is disclosed.

In a further aspect, computerized apparatus useful for searching for documents is disclosed.

In still a further aspect, computerized apparatus useful for encoding documents according to one or more absolute attributes is disclosed.

In yet another aspect, computer-readable apparatus is disclosed. In one embodiment, the apparatus includes a storage medium with at least one computer program disposed thereon. In one variant, the at least one program includes a plurality of instructions which, when executed on a processor, implement a search for a document based on one or more non-changing attributes or features thereof.

In another aspect, a wireless enabled mobile device configured for searching for documents utilizing, inter alia, one or more absolute attributes of a document, is disclosed.

In another aspect, a document reporting system is disclosed. In one embodiment, the system comprises a server and a document database comprising a plurality of documents that each have at least one non-changing or absolute attribute and encoding or data related thereto, and which are searchable in at least one regard.

In yet a further aspect, a method of reducing the latency in the availability of documents (such as legal documents or opinions) is disclosed.

In another aspect, a method of providing a free document citation service is provided. In one variant, the "free" service is supported by, inter alia, advertising revenue generated by the selection and presentation of e.g., contextual advertising along with the document/citations.

DETAILED DESCRIPTION

Figure 1:
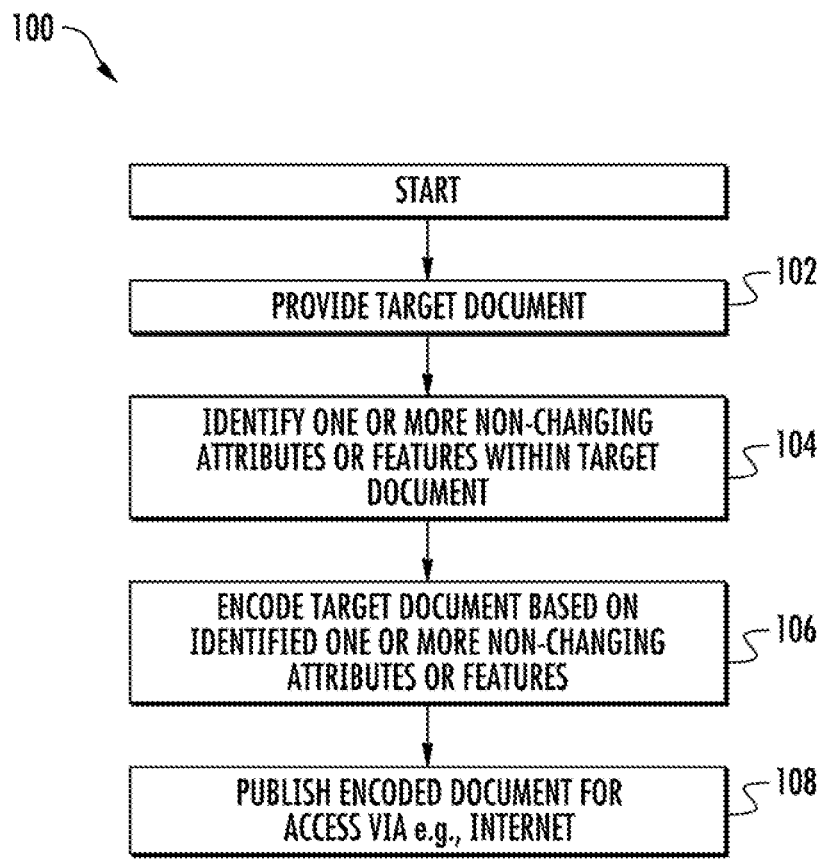
FIG. 1 is a logical flow diagram illustrating one embodiment of a method of utilizing non-changing or absolute citation within a document.

Implementations of the present disclosure will now be described in detail with reference to the drawings, which are provided as illustrative examples so as to enable those skilled in the art to practice the various aspects of the disclosure. Notably, the figures and examples below are not meant to limit the scope of the present invention to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component or step should not be considered limiting; rather, the disclosure is intended to encompass other implementations including a plurality of the same component or step, and vice-versa, unless explicitly stated otherwise herein.

Further, the present disclosure encompasses present and future known equivalents to the components referred to herein by way of illustration.

Overview

In one aspect, a solution to the problems of the foregoing prior art citation systems is to do away with reporter-based systems and the assignment of arbitrary volume and page numbers, and to implement a citation system based on the non-arbitrary attributes of the article or legal decision itself. Because articles and legal decisions are now generally available on the Internet and publically-available websites, they can be readily located using free search engines such as e.g., Google™ or Bing™. Also, because the number of pages that a document (e.g., article or legal decision) occupies depends on the formatting, line spacing, and font size used, the number of pages can be variable and so the use of real page numbers for purposes of citation should also be avoided. Instead, an exemplary citation system can be based on attributes of the article or legal decision that are constant, not arbitrary, and not dependent on arbitrary formatting choices such as number of columns per page, line spacing, and font size. Such an improved citation system also eliminates the problem of having to rely upon a temporary citation system until the volume and page numbers of the reporter are determined.

Exemplary Embodiments

Exemplary embodiments of the methods and apparatus of the disclosure are no described in the context of a legal document, such as an article or court opinion.

The attributes of an article, legal decision or other textual material that are constant and not arbitrary, in addition to the title of the article or the name of the case, the author(s) or name of the court, and the date of the article or legal decision, may include inter alia the number of words, sentences, and/or paragraphs used in the document. These attributes may be considered to be "absolute" in certain respects; they are determined the day the document is completed, and do not depend on arbitrary choices such as reporter volume number, starting page number of the document in the reporter, or formatting choices such as page layout, line spacing, or font size, that can vary the length of the documents in terms of real page numbers.

Accordingly, rather than using a page number for a pinpoint cite to particular text in the document, a "pinpoint" cite according to one exemplary embodiment of the present disclosure can be based on the word, sentence, or paragraph count in the document. For example, a pinpoint citation based on sentence count, such as "S54-58," can be used to cite to the text at the $54^{th}$ through $58^{th}$ sentences in the document. Likewise, a citation form such as "P5" can be used to cite to the text at the fifth paragraph of the document. Such a citation system also has the benefit of being more accurate with respect to pinpoint cites than page numbers, because a "page" of a document can contain many sentences and paragraphs. Similarly, citation based on word count can be used, such as "W465-512" to cite to the text at the 465$^{th}$ through 512$^{th}$ word in the document.

FIG. 1 herein illustrates one exemplary embodiment of a method of utilizing "absolute" citations according to the disclosure. In the method 100, the document is first identified/provided, such as in electronic form (step 102).

Next, one or more absolute attributes within the document are identified (e.g., word count for each paragraph, in sequence) per step 104.

Per step 106, the (electronic) rendering of the document is then encoded with citation data such as for example that described above, so as to produce an encoded document.

Per step 108, the document is then published or made otherwise accessible, such that a user searching for the document can see the encodings (citation data), such as on their computer screen, and cite thereto.

In another aspect, the word, sentence or paragraph counts described above can also be used to create "virtual pages" for purposes of pinpoint citation. For example, a system in which a convention has been established that every 500 words would constitute a virtual page would divide a 3200 word document into seven virtual pages (six full virtual pages and a seventh virtual page having only 200 words). Virtual pages can be defined to be, e.g., other numbers of words, for example, from 100 words to 1000 words. As long as a word number convention is established, a document would be comprised of a consistent number of virtual pages regardless of the formatting choices used to print or display the document. Similarly, virtual pages can be based on sentence or paragraph counts provided that a convention is previously established, for example, every 25 sentences or every four paragraphs could constitute a virtual page. Other numbers of sentences or paragraphs can be used consistent with the disclosure. Again, these virtual pages would not vary based on the arbitrary formatting choices used to present the document, such as single or multiple columns, line spacing, or font size, because they are based on attributes of the document that do not vary.

Further, in various embodiments, such virtual pagination may utilize various mathematical representations (e.g. matrices, polynomials, tuples, etc.). In one or more matrix-based implementations, various entries in a vector (uni-dimensional matrix) may represent values for various document elements (e.g. characters, paragraphs, sections, etc.). By way of non-limiting example such a vector may include value such as [1, 80, 160] representing [characters, paragraphs, sections]. The matrix is the simply multiplied (e.g. dot product) by a second matrix containing the counts of the individual element to yield a text "volume". The count may be calculated at any point in the document from the beginning for the purposes of virtual pagination. However, it will be appreciated that for other applications, the volume between any two points a document may be calculated. A given volume may correspond to different delimitations. For example, a first volume value may correspond to a line and second may correspond to a page. Further, such volumes may be interrelated (e.g. a multiple of the volume corresponding to a line may correspond to a page).

It will further be appreciated that the granularity of the vector may be set at an arbitrary level. For example, every element in a set (e.g. letters in the alphabet, ascii characters, Unicode characters, etc.) may have its own value. Thus, differing characters may have differing contributions to the volume.

Further, contributions from paragraphs may be calculated using a modulus function with arguments (i) a volume between two consecutive returns and (ii) the volume assigned to a line. Similarly, contributions can be calculated for word wrapping using line volume and volume consecutive strings of words (assuming word breaks at spaces) as inputs. Such calculations are simple for modern computers an can be performed in real-time. However, such information may also be calculated in advance of requests and embedded in the document or saved in an associated database.

Alternatively, a monotype font at preselected size may be selected for quick actual pagination. Monotype fonts have equal widths for all characters. Thus, assigning lines and pages is merely dependent on the number of characters, position of returns, etc. Thus, the pagination process is greatly simplified.

In order to realize the citation system described above, documents such as scholarly articles, white papers, patents, and legal decisions can be created within, or scanned or electronically transferred into, a computer or microprocessor-based computing system having document or word-processing capability. Such systems are well-known and widely available in the art, such as Microsoft Word, Lotus Word Pro, WordPerfect, and many others that run on computers, such as desktop, laptop, or personal computers including Windows-based machines, personal computers made by Apple which use their own proprietary operating system, and many others. Such word processing programs are also available on the Internet, sometimes referred to as the "cloud" or "cloud computing," such as Adobe Buzzword, EtherPad, Google Docs, and many others. Many of these word processing programs already include the capability to count the words of a document that is created within, or electronically scanned or transferred into, the program.

Such prior art word processing programs can be readily modified to include the capability to count the number of words, sentences, or paragraphs in a document, if they don't already have such capability. For example, the word processing program can count the number of words in a document by counting each instance of a group of characters followed by a space, which in most instances would signify the end of a word. Other well known techniques can be used to count the words in a document. For example, U.S. Pat. Nos. 5,293,314 and 6,704,698, which are incorporated herein by reference for all that they disclose, describe systems and methods for word counting in documents. The word processing program can also count the number of sentences in a document by, for example, counting each instance of a period, or a period followed by a space, which in most instances would signify the end of a sentence. Likewise, for example, the word processing program can count the number of paragraphs in a document by counting each instance of a hard return, or a hard return followed by a tab or indent to signify the start of a new paragraph. Other well known techniques can be used to count sentences or paragraphs in a document. For example, U.S. Pat. No. 4,773,009, which is incorporated herein by reference for all that it discloses, describes systems and methods for identifying the boundaries of sentences and paragraphs in a document that may be used to count the sentences or paragraphs.

Preferably, but not necessarily, to the extent the various word processing systems and software that may be used to create and view documents utilize consistent rules and protocols for counting the words, sentences, or paragraphs of a document, the document-based citation system described herein would yield more consistent and repeatable citations from system to system used to create or view the document. However, it must also be appreciated that prior art citation systems are only capable of locating a pinpoint cite to within a page of the reporter, which is a relatively crude level of accuracy given the computing power presently available. For example, a pinpoint citation to particular text in a legal decision presently indicates only the page in the reporter in which the sentence appears, thus requiring the reader to search through the entire page to locate the text cited. Accordingly, a citation system that yields pinpoint citations repeatable from system to system to within a few words, sentences, or even paragraphs would still be more accurate than prior art citation systems and save time for those attempting to locate the citation within the document.

It will also be appreciated that in the exemplary context of a user searching for a given document (e.g., court opinion) via a search engine on a network such as the Internet, various degrees of "matches" may be used. For instance, a user might search based on a name of a case which is unique, or may search on a particular piece of information within the document (e.g., a word, phrase, or even concept). Hence, the various implementations of the present disclosure are readily used with so called Boolean and/or "natural language" search engines to identify a document when the search query is not precise or only conceptually relates to the desired document. To this end, the exemplary citation approaches described herein do not in any way interfere with such textual, Boolean, or natural language search approaches.

In one embodiment of the disclosure, the word processing system used to create the document would automatically count the words, sentences, or paragraphs in the document, and periodically include, for example, in the margins or superscript text, or as embedded code/fields, indicators of the word, sentence, or paragraph count in the document. For example, a count indicator can be placed in the document after every 100 words (e.g., W100, W200, W300, etc.), or every 10 sentences (e.g. S10, S20, S30, etc.), or near every paragraph (e.g., P1, P2, P3, etc.). Those wishing to cite to the document can then use these count indicators to pinpoint cite to particular text in the document. For example, a pinpoint citation to W500-600 would indicate the relevant text is located between the $500^{th}$ and $600^{th}$ word of the document. Likewise, a pinpoint citation to S37-44 would indicate the relevant text is located between the $37^{th}$ and $44^{th}$ sentence of the document. Such indicators can also be used for "virtual pages" as discussed herein (e.g., VP1, VP2, VP3, etc.). Particular words can also be used as the reference basis; e.g., the tenth word after the first occurrence of the word "case", the paragraph wherein "case" is used 4 times, or the like.

The indicators can be shown on the printed hardcopy document, or only displayed electronically on the document, as when the document is up on a computer display. Using well-known systems and methods, the count indicators can also be displayed as an information bubble when the cursor of the computer system hovers over a particular word, sentence, paragraph, or virtual page of the document. For example, if the user wishes to cite to a particular group of words in the document, the user can simply move the cursor, by a mouse or other well-known means, over the chosen words to see the corresponding word count at that location in a pop-up window or bubble. Similarly, sentence, paragraph, or virtual page count indicators can be displayed as the cursor is moved over the document. Such a system would be easier to use than the prior art method of having to locate arbitrary page number indicators in the document that generally do not correspond to the pagination of the document as displayed in electronic form.

In addition, such word/sentence counts and the above discussed volume-based line and page calculations may be used to automatically create such pinpoint cites for highlighted text. For example, using a volume embodiment, a user highlighting a string of text (or otherwise indicating a selected string) prompts the system to calculate the volume values (from the beginning of the document) for the both the beginning and end of the string. The volume values are easily converted into virtual page/line numbers and a citation is generated.

This automatic pin-point citation generation may be integrated into the functionality of various citation managers (e.g. Endnote, Zotero, Mendely, etc.) word processors (MS Word, Wordperfect, Lotus, Google Docs, etc.) using macros, markup files (XML, etc.), plug-ins, and/or scripts. For example, a citation may be automatically generated in a given program when the selected text is input into it (e.g. via a copy and paste operation).

It will be appreciated that while the foregoing (and subsequent) description make reference to criteria or parameter such as word count, sentence count, paragraph count, etc., these values need not necessarily be limited to discrete values. For instance, it is envisaged that certain grammatical or other rules may cause slight variations in what a given computer program (or person) would consider the "word count" to be. As an example, a computer program may "autocorrect" a contraction or grammatical error (or even less preferred usage of a word) to two words, thereby changing the word count or compliance with a given stream of characters (e.g., "can't" versus "cannot" versus "can not"). Likewise, an editor may identify a grammatical or typographical error, and insert "{sic}" to identify the error, again causing the string/word count to be off. Hence, various embodiments of the methods/apparatus of the present disclosure are configured to account for such minor variations. In one such embodiment, an "error band" (e.g., one word plus or minus) is specified, whether on a per-sentence, per-paragraph, per-document, or other basis, such that the document can be positively identified and cited within the error band.

It is also appreciated that while some embodiments of the methods and/or apparatus disclosed herein will utilize a "total" count (e.g., total number of words, sentences, paragraphs, etc. within the document), as may be useful in searching for a document on the Internet for example, partial counts may be used as well. For instance, if a citation of "P5" is used, the computer program, human, or other entity looking for the citation need only count to paragraph 5 to locate the desired material. It is, in this context, irrelevant how many total paragraphs exist in the document.

For pre-existing documents or documents not created on a word processing system employing a word, sentence, or paragraph counting capability, such documents can be scanned into a word processing system employing a word, sentence, or paragraph counting capability using well known scanning and character recognition technology, or otherwise electronically transferred into such a word processing system using well known electronic file transfer and copying technologies, including disk and optical drives, magnetic tape, solid state and flash drives, FTP, email, and other Internet-based file transfer technologies. Such documents can then be printed or displayed on a computer screen or monitor, for example, including the word, sentence, paragraph, or virtual page count indicators discussed herein. See FIG. 2, which illustrates one exemplary embodiment of a computerized document system according to the present disclosure.

Figure 2:
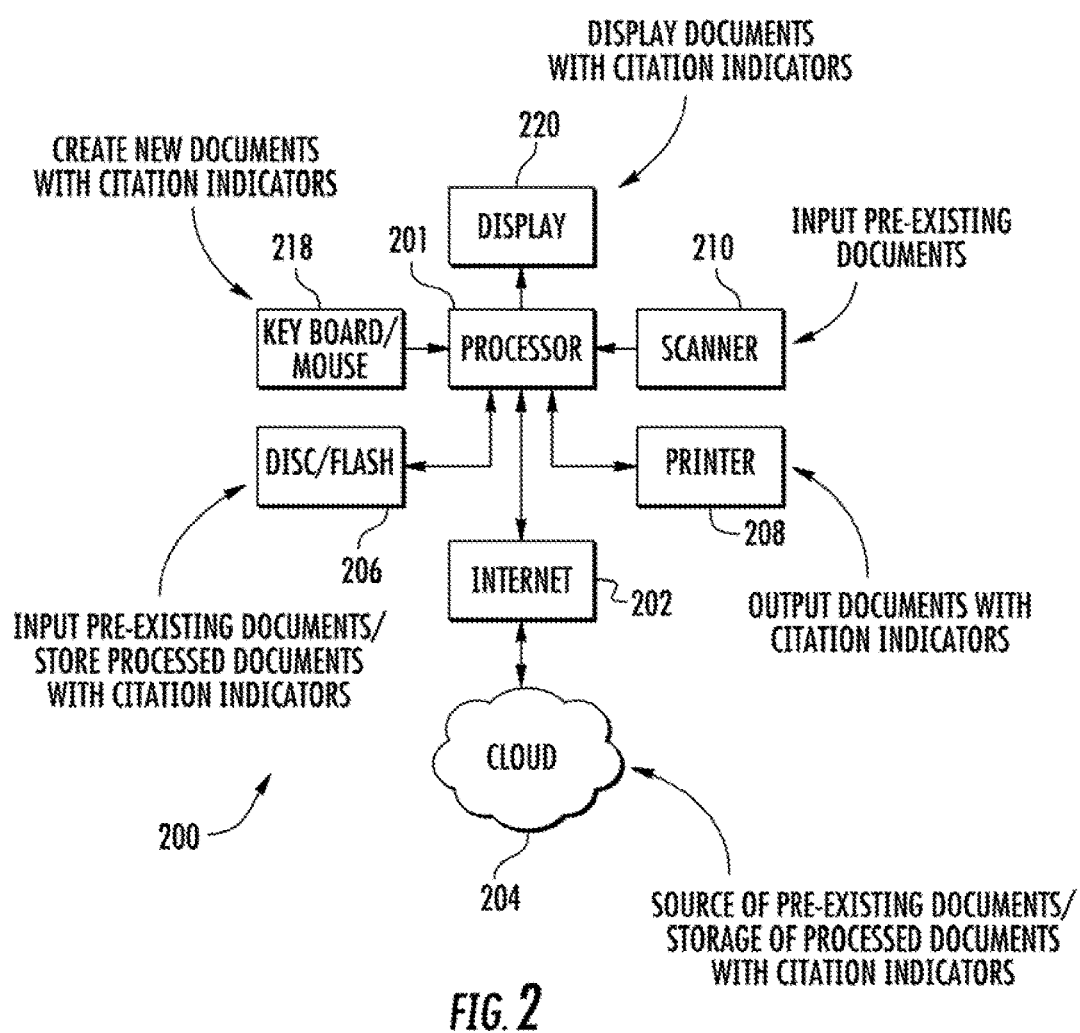
FIG. 2 is a logical block diagram illustrating one embodiment of a computerized document system according to the present disclosure.

As shown in FIG. 2, the exemplary system 200 includes a computerized device having a processor 201 and associated interface to the Internet 202 (and hence the "cloud" 204, which may be any other network or aggregation of networks such as MANs, WANs, P2P networks, whether wired, optical, and/or wireless in nature, and entities associated therewith), as well as I/O and peripherals such as memory/storage devices 206, printers 208, scanner 210, keyboard/mouse 218, and display device 220. The foregoing components can be used to, in one embodiment, create new documents with citation indicators (e.g., via the keyboard/mouse 218, or other devices such as touch screen inputs, stylus, etc.), input pre-existing documents (such as via the scanner 210, or via a data interface such as a USB, IEEE-1394, WLAN, Bluetooth, Ethernet, or other such interface), and store the documents in e.g., the storage device(s) 206. In one variant, a dedicated computer program application is configured to run on the processor 201, and aid the user in creation/importation/editing of citation-based documents, somewhat akin to a prior art word processing program. Documents may either be uploaded to the cloud 204 (such as for storage thereon), or received (pulled down) from the cloud for editing, etc.

It will be appreciated that while the exemplary embodiment of FIG. 2 is described in a certain hardware context, the present disclosure is in no way so limited, and may be practiced on literally any hardware/software environment capable of processing data. For example, the disclosure contemplates advantageous mobile use of the system on e.g., a smartphone, tablet/phablet, or notebook/laptop device. Moreover, the features described herein may be entirely "cloud" based, such as where a user merely logs in on any available platform, and all salient functionality (such as retrieval, storage, etc.) is performed on the cloud.

Accordingly, using the system of e.g., FIG. 2, any document can be cited to or from using the document attribute-based citation system described herein, without reference to arbitrary volume and page numbers of a proprietary reporter-based system.

Using one or more aspects of this disclosure, for example, a searchable database of documents such as legal decisions can be readily constructed in which the legal decisions all include word, sentence, or paragraph count indicators as described above. Such a searchable database can be made available on the Internet through well known techniques, such as the currently-available searchable database of Federal Circuit decisions on that court's website at cafc.uscourts.gov. Such a system can readily be kept current with the latest legal decisions being added virtually the same day they are issued by the court. For example, each court can maintain its own searchable database, or the various courts can upload their decisions as they are issued to a common database of legal decisions. See FIG. 3, which illustrates one exemplary embodiment of a networked computerized document database system according to the present disclosure.

Figure 3:
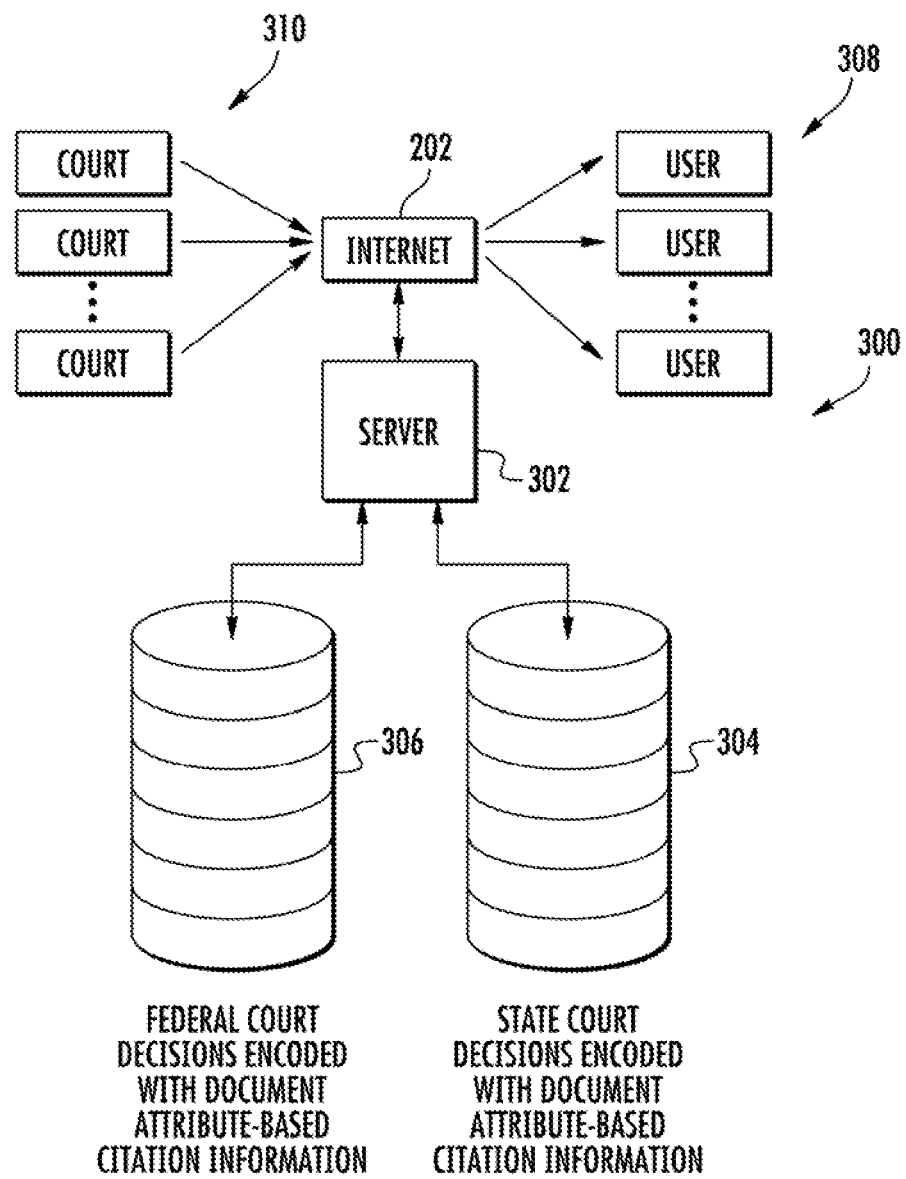
FIG. 3 is a logical block diagram illustrating one embodiment of a networked computerized document database system according to the present disclosure.

As shown in FIG. 3, the exemplary database system 300 includes a centralized (or distributed) server architecture 302, which is coupled to the Internet 202 via e.g., a network interface (not shown). One or more courts 310 can access the databases 304, 306 via the Internet connection and server 302, as can individual or other users 308. The databases 304, 306 may be configured according to any number of different schemes, including for example having one database 304 be dedicated to state court decisions or other materials that have been encoded with the aforementioned citation scheme, and a second database 306 for federal court decisions or other materials. Any other logical schemes (or combinations) may be used consistent with the disclosure, as will be appreciated by those of ordinary skill.

Such a central database may also assign a serial number to each legal decision to simplify the search process. The serial number may be generated deterministically. For example, letters designating the court (SCOTUS, CAFC, etc)) and the date and time (e.g. MMDDYYYYhhmm) of an opinion's release and may be used. Thus, users need not wait for such a serial number to be published before referencing it. Using such a searchable database, and the innovative citation system described herein, legal decisions can be made available to be cited to or from, virtually the same day they are issued by the court, avoiding the need for a cumbersome temporary citation system while awaiting the placement of the decision in a reporter.

Further, such a database containing content from multiple legal sources may be able to inter-associate documents which reference other documents. In one embodiment, the database may be able to find a given string of text (e.g. a quote) in multiple sources (e.g. a primary document and a secondary document quoting the primary). The database may then generate a corresponding citation for each source. For example, a patent practitioner may to cite a specific piece of caselaw, but prefers to cite the Manual of Patent Examination Procedure (MPEP) rather than the original court document. The searchable database may then locate both the original case and the appearance in the MPEP and generate citations for both. Similarly, multiple versions/revisions of a single document may be treated similarly. For situations in which an exact text match cannot be found, multiple possible/probable citations may be generated. Thus, a user may only need to know certain aspects of a quote (keywords, key concepts, general subject matter) to locate it within the reference material.

It will be appreciated that the above discussed functionalities may be integrated into existing search engines and/or databases (Google, Bing, JStor, etc.) using web applications.

The various courts (or other responsible entity) could also charge a modest fee to lawyers, law flints, and other users for access to the database of legal decisions that the courts author, including the citation indicators described herein (e.g., word, sentence, paragraph, or virtual page count indicators), thus providing additional needed operating funds for the various state and federal court systems struggling with the burdens of increasing caseloads and diminishing financial resources. This arrangement would yield a more sound and robust judicial system within the United States, increasing the accessibility of the judicial system, and appropriately defraying the expenses associated with creating the well-reasoned legal precedents so vital to the continuing operation of the American legal system.

As another option, any entities responsible for providing e.g., encoded content (such as court opinions with absolute citations) could make these documents free and broadly publicly accessible, yet supplement their operations financially via other mechanisms. For instance, when a given citation is requested or searched by a user, the results could be displayed with an advertisement or promotion, the commissioning party of the advertisement or promotion (e.g., Company X) paying the service provider a fee for placement of the spot. These advertisements or promotions may also contextually related to the document in one form or another; e.g., the general subject of the document (such as "legal", "patent", "Appeal", etc.), or to specific attributes of the citation or portions of interest (e.g., a citation to a landmark opinion on health care may elicit contextual advertisements for healthcare or medical services, pharmaceuticals, etc.).

The various aspects of this disclosure may also be used to create a searchable database of e.g., issued patents, which currently use a citation system based on column and line numbers. Again, this prior art citation system depends upon arbitrary formatting choices such as font size when the patent is officially printed and issued. Patents are now generally created on electronic word processing systems, and may be conveniently viewed electronically in native format that does not coincide with the formatting used for the official printed patent document. However, in native format the column and line numbers are not present on the patent document, making citation to particular text in the patent virtually impossible. These problems can be overcome using the citation system described herein based on word, sentence, or paragraph count indicators that would not vary regardless of how the patent is printed or displayed.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A method of citing at least one portion of interest within a document, the document capable of existing and being presented to a reader either electronically or in a hard copy form in a plurality of differing formatting instances, and thereby capable of appearing to the reader in a plurality of differing words per page and differing total page numbers despite the fact that a number of words, a number of sentences, and a number of paragraphs for the document is unvarying, the method comprising:
   selecting an unvarying attribute of the document selected from the group consisting of the: (i) number of words, (ii) number of sentences, and (iii) number of paragraphs, in the document, the unvarying attribute comprising the number of words, the number of sentences and the number of paragraphs from a starting point associated with the document;
   assigning a sequence number to each (i) word, (ii) sentence, and (iii) paragraph in the document, the sequence number ranging from one to the total number of (i) words, (ii) sentences, and (iii) paragraphs in the document based on the starting point associated with the document;
   identifying, by a range of sequence numbers, one or more (i) words; (ii) sentences, or (iii) paragraphs in the document dependent upon the assigned sequence number;
   utilizing the identified range of sequence numbers of the one or more (i) words; (ii) sentences, and (iii) paragraphs to identify content of interest in the document; and
   locating the content of interest within the document using the identified range of sequence numbers, irrespective of a formatting instance for the document.

2. The method of claim 1, wherein the document comprises a published opinion from a state or federal court.

3. The method of claim 1, wherein the document comprises an electronic data file or rendering of the document, and the selecting, assigning, identifying, utilizing, and locating are performed by a user via an application computer program running on a computerized device.

4. The method of claim 1, further comprising:
   evaluating the content within the document to identify a context associated therewith; and
   selecting secondary content from a source, the secondary content selection being based at least in part on the identified context.

5. The method of claim 1, wherein the document comprises an electronic data file, and the acts of identifying, utilizing, and locating are performed by a user via an application computer program running on a computerized device and the method further comprises:
   providing to the user the assigned sequence numbers for each (i) word; (ii) sentence, and (iii) paragraph in the document via a pop-up bubble as a cursor is hovered over each (i) word; (ii) sentence, and (iii) paragraph of the document.

6. A document citation system, comprising:
   at least one database; and
   at least one server in data communication with the at least one database;
   at least one computer program operative to run on the server and configured to:
      obtain a document in an unencoded form;
      select an unvarying attribute of the document selected from the group consisting of a: (i) number of words, (ii) number of sentences, and (iii) number of paragraphs in the document, the unvarying attribute comprising the number of words, the number of sentences and the number of paragraphs from a starting point associated with the document;
      encode the document using the unvarying attribute by assigning a plurality of sequence numbers to each (i) word, (ii) sentence, and (iii) paragraph in the document such that a user can utilize the encoded document to identify text of interest therein based on a range of the sequence numbers for the: (i) words, (ii) sentences, and (iii) paragraphs irrespective of a formatting instance for the document; and
      allow a second user to locate the text of interest in the document using a citation based upon the range of sequence numbers assigned to the text of interest.

7. The system of claim 6, further comprising an internetworking interface, and wherein the encoded document is non-proprietary and publicly accessible via the internetworking interface at no cost to users.

8. The system of claim 6, wherein:
   the encoded document is non-proprietary and publicly accessible at no cost to users; and
   the system is further configured to cause delivery of advertising or promotional content along with the document or encoded portions thereof.

9. The system of claim 8, wherein the advertising or promotional content is contextually related to at least one attribute or facet of the document or encoded portions thereof.

10. The system of claim 6, further comprising a display wherein the at least one computer program operative to run on the server is further configured to provide to the user the assigned sequence numbers for each (i) word; (ii) sentence, and (iii) paragraph via a pop-up bubble as a cursor on the display is hovered over each (i) word; (ii) sentence, and (iii) paragraph of the document.

\* \* \* \* \*